United States Patent
Zhao et al.

(10) Patent No.: US 10,511,419 B2
(45) Date of Patent: Dec. 17, 2019

(54) MULTI-USER GROUPING

(71) Applicant: Cisco Technology, Inc., San Jose, CA (US)

(72) Inventors: Qing Zhao, Fremont, CA (US); Benjamin Jacob Cizdziel, San Jose, CA (US); Jin Xie, Milpitas, CA (US); David Kloper, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/803,785

(22) Filed: Nov. 5, 2017

(65) Prior Publication Data

US 2019/0140791 A1    May 9, 2019

(51) Int. Cl.
| | |
|---|---|
| *H04L 5/00* | (2006.01) |
| *H04W 4/08* | (2009.01) |
| *H04W 72/04* | (2009.01) |
| *H04L 12/70* | (2013.01) |
| *H04B 7/0452* | (2017.01) |
| *H04L 29/06* | (2006.01) |

(52) U.S. Cl.
CPC ............ *H04L 5/0037* (2013.01); *H04L 47/00* (2013.01); *H04W 4/08* (2013.01); *H04W 72/048* (2013.01); *H04B 7/0452* (2013.01); *H04L 5/0071* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2015/0245375 A1* | 8/2015 | Li | ................ | H04L 5/0051 370/329 |
| 2016/0174230 A1* | 6/2016 | Benjebbour | ........ | H04W 52/346 370/329 |
| 2016/0360543 A1* | 12/2016 | Elsherif | ............... | H04B 7/0452 |

(Continued)

FOREIGN PATENT DOCUMENTS

CN    102958172    12/2015

OTHER PUBLICATIONS

Hottinen, Ari et al.; Subcarrier Allocation in a Multiuser MIMO Channel Using Linear Programming, 2006 14th European Signal Processing Conference, Florence, 2006, pp. 1-5.

(Continued)

*Primary Examiner* — Robert M Morlan (57) ABSTRACT

In one embodiment, a system includes a processor to determine a number P of how many multi-user groups are to be formed to promote airtime fairness for N client devices in which each one client device of the N client devices will be equally represented in the to-be-formed multi-user groups and in which each of the to-be-formed groups is to be actively considered by a scheduler for transmission purposes, the N client devices being associated with N wireless connections with an access point having multi-user simultaneous communication multiple-input multiple-output technology, define P multi-user groups with each one multi-user group of the P multi-user groups having a capacity for M client devices from the N client devices, N being greater than M, and allocate the N client devices to the P multi-user groups with each one client devices of the N client devices being equally represented in the P multi-user groups.

23 Claims, 5 Drawing Sheets

(56) References Cited

U.S. PATENT DOCUMENTS

2017/0164385 A1    6/2017  Bhanage et al.
2017/0338873 A1* 11/2017  Yue ..................... H04B 7/0452
2018/0375613 A1* 12/2018  Byun ....................... H04L 1/00

OTHER PUBLICATIONS

Huang, Min et al.; Design of Low-Latency Uplink Mac Scheduling for Massive MIMO-OFDM Systems, 2017 IEEE International Conference on Communications Workshops (ICC Workshops), Paris, 2017, pp. 632-638.

Liao, Ruizhi et al.; MU-MIMO Mac Protocols for Wireless Local Area Networks: A Survey, in IEEE Communications Surveys & Tutorials, vol. 18, No. 1, pp. 162-183, Firstquarter 2016.

Meraki; Channel Planning Best Practices, 2015, Article ID: 2012.

Valls, V. et al.; Proportional Fair MU-MIMO in 802.11 WLANS, in IEEE Wireless Communications Letters, vol. 3, No. 2, pp. 221-224, Apr. 2014. doi: 10.1109/WCL.2014.020314.130884.

* cited by examiner

MULTI-USER GROUPING

TECHNICAL FIELD

The present disclosure generally relates to multi-user group selection to promote airtime fairness and reduce scheduling complexity.

BACKGROUND

Multi-user multiple-input multiple-output (MU-MIMO) technology enables sending different traffic to multiple client devices simultaneously. Multi-user grouping refers to selecting client devices from a plurality of client devices to form a group for sending different traffic to the selected client devices simultaneously. A scheduler provides a mechanism for selecting which data to send to which user(s) in a given time slot. Airtime fairness in a wireless environment is an attempt to allot airtime between competing client devices in an equitable manner while taking into account the various priorities of the traffic associated with the client devices. Airtime fairness may be applied to other multi-user simultaneous communication technologies, for example, but not limited to, orthogonal frequency-division multiple access (OFDMA), which is a multi-user version of the popular orthogonal frequency-division multiplexing (OFDM) digital modulation scheme. Multiple access is achieved in OFDMA by assigning subsets of subcarriers to individual users. This allows simultaneous low-data-rate transmission from several users.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a system including a processor, and a memory to store data used by the processor, wherein the processor is operative to determine a number P of how many multi-user groups are to be formed to promote airtime fairness for N client devices in which each one client device of the N client devices will be equally represented in the to-be-formed multi-user groups and in which each one of the to-be-formed multi-user groups is to be actively considered by a scheduler for transmission purposes, the N client devices being associated with N wireless connections with an access point having multi-user simultaneous communication multiple-input multiple-output technology, define P multi-user groups with each one multi-user group of the P multi-user groups having a capacity for M client devices from the N client devices, N being greater than M, and allocate the N client devices to the P multi-user groups with each one client devices of the N client devices being equally represented in the P multi-user groups.

DETAILED DESCRIPTION

The embodiments of FIGS. 1-7 are described with reference to downlink (DL) multi-user multiple-input multiple-output (MU-MIMO) technology. It will be appreciated that the present disclosure is not limited to DL MU-MIMO but may additionally, or alternatively applied to uplink (UL) MU-MIMO as well as other DL and/or UL multi-user simultaneous communication technologies, for example, but not limited to orthogonal frequency-division multiple access (OFDMA).

Figure 1:
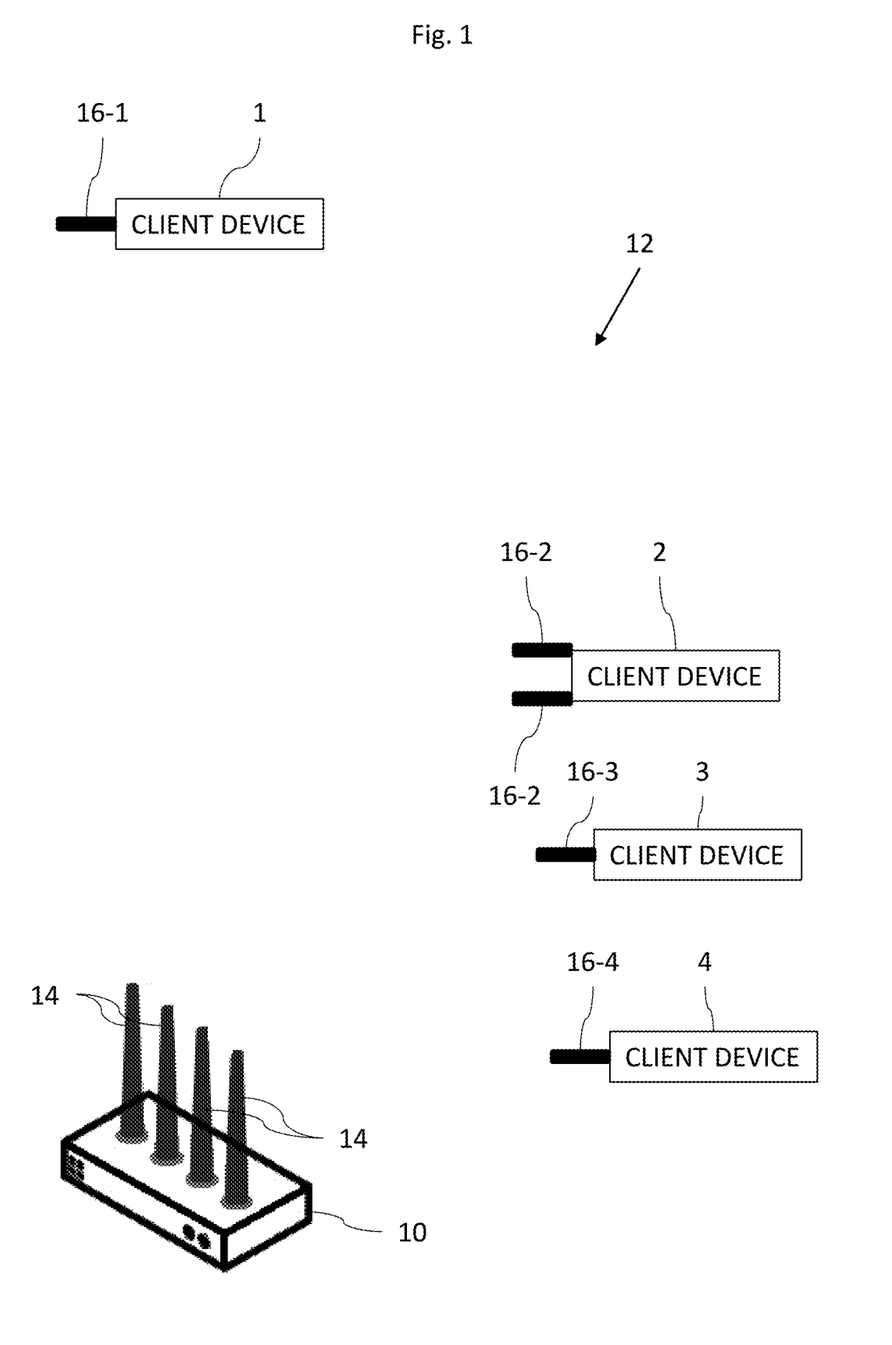
FIG. 1 is a block diagram view of a wireless communication system including an access point and a plurality of client devices constructed and operative in accordance with an embodiment of the present disclosure.

Reference is now made to FIG. 1, which is a block diagram view of a plurality of client devices 1, 2, 3, 4 and an access point 10 in a wireless communication system 12 constructed and operative in accordance with an embodiment of the present disclosure. The access point 10 includes a plurality of antennas 14 for wirelessly communicating with the client devices 1, 2, 3, 4 using multi-user multiple-input multiple-output (MU-MIMO) technology. Each of the client devices 1, 2, 3, 4 includes at least one antenna 16 (labeled 16-1 to 16-4 associated with the client devices 1 to 4 respectively) for communicating with the access point 10 and any other suitable wireless device. Each of client devices 1, 3, 4 includes a single antenna 16. Client device 2 includes two antennas 16-2. In the example of FIG. 1, the access point 10 may transmit data simultaneously during any time period to any three of the client devices 1, 2, 3, 4. It will be appreciated that the wireless communication system 12 may be implemented with single-stream client devices or with multi-stream client devices that may be configured to receive and/or transmit multiple streams or a single stream using beamforming technology. A multi-stream client device configured to receive/transmit a single stream may be considered as a single stream client device for the purposes of this disclosure.

Figure 2:
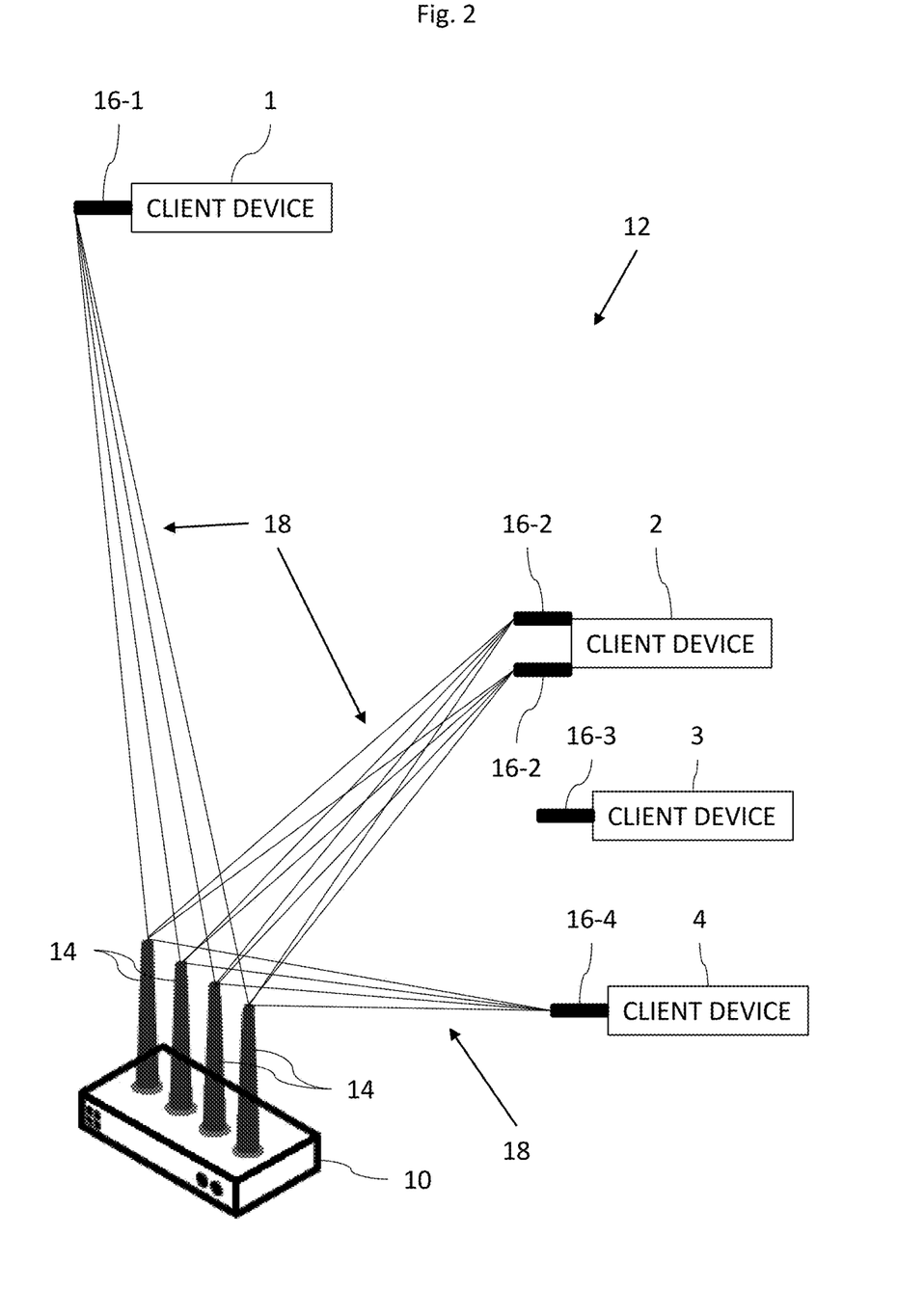
FIG. 2 is a block diagram view showing the access point transmitting data to a first group of the client devices in the system of FIG. 1.

Reference is now made to FIG. 2, which is a block diagram view showing the access point 10 transmitting data streams 18 to a first group of the client devices 1, 2, 4 in the system 12 of FIG. 1. The data streams 18 are transmitted simultaneously using beamforming technology to the client devices 1, 2, 4 in the first group as three different data streams 18, one stream 18 for each of the client devices 1, 2, 4.

Figure 3:
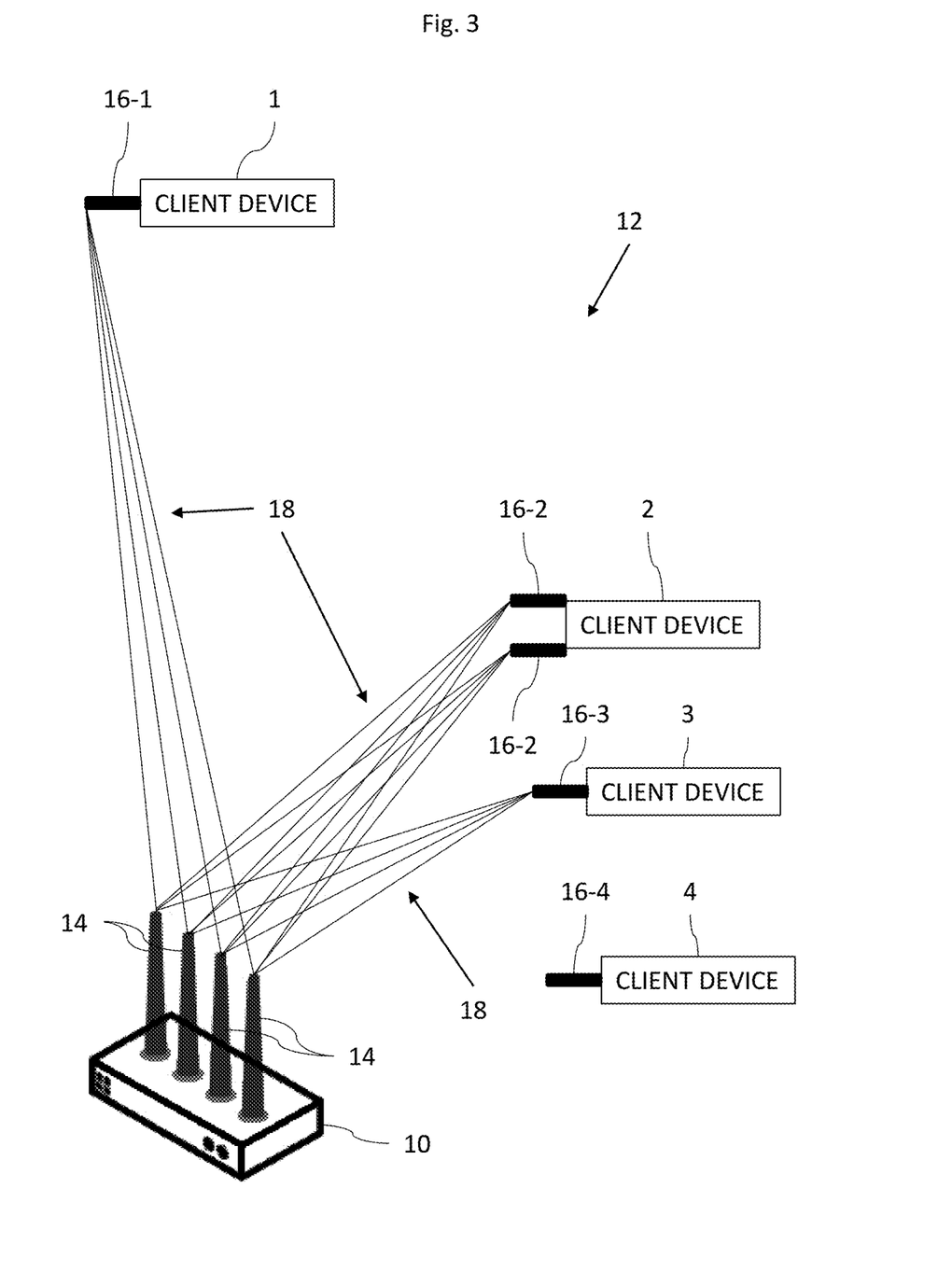
FIG. 3 is a block diagram view showing the access point transmitting data to a second group of the client devices in the system of FIG. 1.

Reference is now made to FIG. 3, which is a block diagram view showing the access point 10 transmitting data streams 18 to a second group of the client devices 1, 2, 3 in the system 12 of FIG. 1. The data streams 18 is transmitted simultaneously using beamforming technology to the client devices 1, 2, 3 in the second group as three different data streams 18, one stream 18 for each of the client devices 1, 2, 3.

The client devices selected by the access point 10 for transmission to, form part of a multi-user group, sometimes referred to herein as a group. The groups may also be considered transmission groups. It should be noted that the multi-user groups referred to herein are not necessarily groups as defined by the 802.11ac standard (clients having pre-arranged group identifications and user positions that are assigned by an access point). As will be described in more detail below, multiple groups, including different combinations of client devices 1, 2, 3, 4, may be defined. During each transmission time period one of the groups is selected, by a scheduler, and data is then transmitted to the client devices in the selected group by the access point 10 during that time period. It should be noted that each of the defined groups is actively considered by the scheduler for transmission purposes. The same group may be selected in two or more consecutive time periods. The group that is selected, by the scheduler, may be selected according to any suitable criteria, for example, but not limited to, based on the priority of the data streams being sent to the client devices in each of the groups. The priority of the data streams may be dependent on data type, for example, voice may have the highest priority, video may have the next highest priority, and other data may have a lower priority. Alternatively, the group may be selected on a random or round robin basis, by way of example only.

Multi-user grouping may attempt to maximize aggregated network throughput by grouping clients based on clients' capability, channel state, and/or traffic characteristics. However, the wireless communication system 12 is operative to promote airtime fairness generally without sacrificing throughput. In the example of FIG. 1, there are four client devices 1, 2, 3, 4 and each group allows up to three single-stream client devices. If only two groups are defined, such as: group 1—client devices 1, 2, 4; and group 2—client devices 1, 2, 3, then airtime fairness cannot generally be achieved without degrading throughput, no matter how well the scheduler is programmed. In order to simplify the representation of the groups, the client devices 1, 2, 3, 4 may be referred to as s1, s2, s3, s4, respectively, below. It will be appreciated that reference to four client devices is not limiting and that any suitable number of client devices may be used during group selection. It will also be appreciated that three client devices per group is exemplary and any suitable number of client devices per group may be used which is typically limited according to the technical specification of the access point 10.

In the example of FIG. 1, if the following four multi-user groups, i.e., (s1, s2, s3), (s1, s2, s4), (s1, s3, s4) and (s2, s3 s4) are defined, it is generally possible to achieve airtime fairness without sacrificing throughput because each of the client devices is represented equally among the groups. In other words, the count of each of the client devices is equal among the groups. It will be appreciated that as the number of connected client devices increases then the complexity of group selection increases. Defining the number of groups and allocating client devices to groups is described in more detail with reference to FIG. 5. Amending groups when client devices are added or removed is described in more detail with reference to FIGS. 6 and 7.

The wireless communication system 12 reduces multi-user scheduler runtime and/or search complexity by reducing the number of potentially schedulable groups to an equal amount for each client device. The more client devices connected to the access point 10, the more group combinations are possible, and the number of CPU cycles used in scheduling may become very high if the scheduler searches through all the combinations. In some cases, "dead airtime" may occur where airtime is unused due to the scheduler taking too long to select a group for transmission. Each client device being allocated to the same number of groups for the scheduler to consider may promote (increase the likelihood of) airtime fairness. Airtime fairness may also depend on the type of traffic load and the scheduling method used. Therefore, wireless communication system 12 does not necessarily guarantee airtime fairness, but promotes airtime fairness. It should be noted that the methods described herein are not necessarily limited to "static" grouping (creating groups during initial running and subsequently amending the groups when a client device is added or removed). Instead regrouping may occur periodically to generate an equal number of groups for each device client with different group combinations than used previously. The change in the members of the groups may be guided by performance statistics of groups and/or traffic load history of each group, etc.

Figure 4:
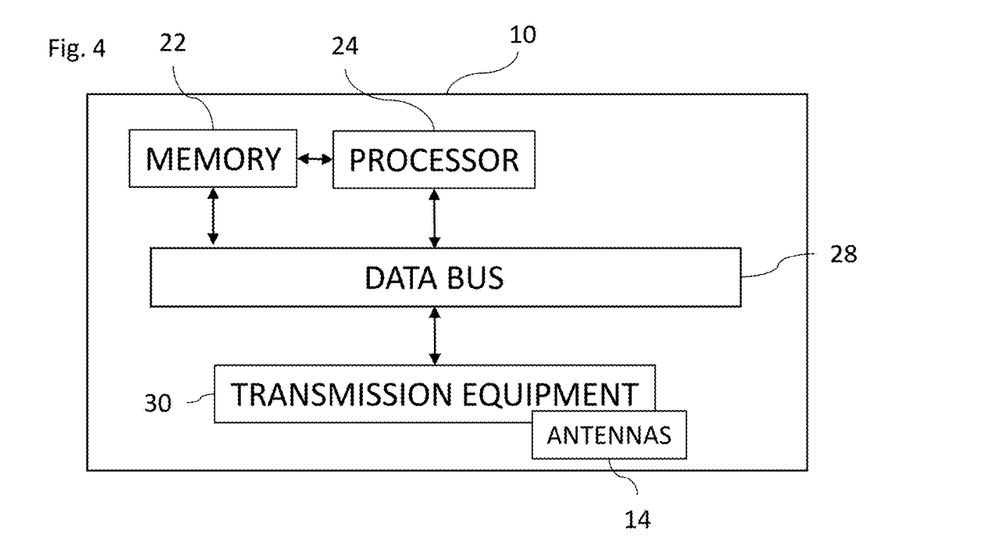
FIG. 4 is a detailed block diagram view of the access point of FIG. 1.

Reference is now made to FIG. 4, which is a detailed block diagram view of the access point 10 of FIG. 1. The access point 10 may include a memory 22, a processor 24, a data bus 28, and MU-MIMO transmission equipment 30. The memory 22 is operative to store data used by the processor 24. The processor 24 is operative to determine the number of groups, define the groups, allocate client devices to the groups, manage the groups, and run a scheduler, as described in more detail with reference to FIGS. 5-7. In accordance with an alternative embodiment of the present disclosure, a processor in a server external to the access point 10 or in a cloud-computing environment may be operative to determine the number of groups, define the groups, allocate client devices to the groups, manage the groups, and send the information about the groups to the access point 10. A processor in a server external to the access point 10 or in a cloud-computing environment may be operative to select groups for transmission of data and send the selection decisions to the access point 10. The MU-MIMO transmission equipment 30 is operative to prepare data for transmission to the client devices 1, 2, 3, 4 via the antennas 14 (FIG. 1). The data bus 28 is operative to connect the various elements of the access point 10 for data communication purposes.

Figure 5:
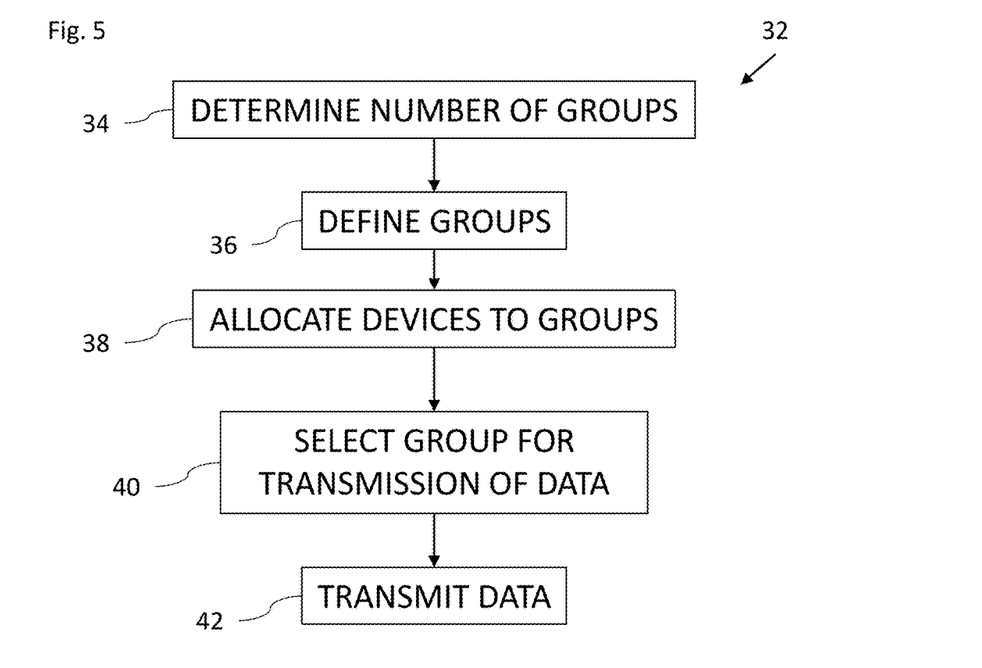
FIG. 5 is a flow chart including exemplary steps in a method for use in the system of FIG. 1.

Reference is now made to FIG. 5, which is a flow chart 32 including exemplary steps in a method for use in the system 12 of FIG. 1. Reference is also made to FIG. 4. A discussion follows regarding determining the number of multi-user groups in order to support airtime fairness so that the data client devices may be equally assigned over the to-be-formed multi-user groups.

Let us denote the number of client devices connected to the access point 10 as N, and the maximum number of client devices that a multi-user group can support as M which may be dependent on configuration of the access point 10.

To promote airtime fairness, assuming each group is assigned the maximum number of client devices that a group can be assigned, the number of multi-user groups that each client device belongs to is identical for all client devices. The following two mathematical lemmas define the number of multi-user groups to promote airtime fairness for N being greater than M. If N is less than or equal to M, a trivial solution is to generate a single multi-user group includes all N clients. Thus, the disclosure herein below refers to the case of N being greater than M. It should be noted that $C(x, y)$ is the total number of combinations that may be yielded from selecting any different y elements from x elements.

Lemma 1: If N is greater than M, and N is multiple of M, the number of multi-user groups that a client device may belong to in order to promote fairness could be any number from 1 to C(N−1, M−1). For k multi-user groups per client device, the total number of multi-user groups is $$k \cdot \left(\frac{N}{M}\right).$$

Lemma 2: If N is greater than M, and N is not multiple of M, the number of multi-user groups that a client device may belong to in order to promote fairness is k·M, where k is from 1 to [C(N−1, M−1)]/M. For k·M multi-user groups per client device, the total number of multi-user groups is k·N.

For example, if N=6 and M=3, the possible number of multi-user groups per client device to promote fairness could be 1, 2, . . . or 10, and the total number of multi-user groups could be 2, 4, 6, . . . , 20, respectively. If N=7 and M=3, the possible number of multi-user groups per client device to promote fairness could be 3, 6, 9, 12, or 15, and the total number of groups could be 7, 14, 21, 28 or 35, respectively. Creating a different number of groups per client device may not promote fairness without sacrificing peak throughput.

When a client device connects to, or disconnects from, the access point 10, the number of client devices N changes and generally, the number of multi-user groups to promote airtime fairness is not the same as the current number of multi-user groups. Therefore, either the current groups are discarded and replaced with new groups based on a new calculation of the multi-user groups based on the new number of client devices or some of the current groups may be retained with appropriate changes while adding or removing one or more multi-user groups. A method for retaining the multi-user groups with appropriate changes is described below with reference to FIGS. 6 and 7. It will be appreciated that retaining the current groups with appropriate changes may generally be more efficient than discarding the current groups and replacing the current groups with new groups. The efficiency may stem from saving processing time and saving time informing the client devices regarding the replacement groups. It should also be noted from the lemmas above that when N is a multiple of M, less groups are required to promote fairness. Therefore, when the method for retaining groups with appropriate changes is employed, it is generally better to set the total number of groups as a multiple of N whether or not N is a multiple of M, in order to minimize changes to the groups when the number of client devices changes. So for example, setting the number of groups as equal to N with M groups per client may provide a more optimal number of groups while promoting airtime fairness.

The above is now described in more detail. The processor 24 is operative to determine (block 34) a number P of how many multi-user groups are to be formed to promote airtime fairness for N client devices in which each client device of the N client devices will be equally represented in the to-be-formed multi-user groups. The N client devices are associated with N wireless connections between the client devices 1, 2, 3, 4 (by way of example only) and the access point 10 having MU-MIMO technology. It will be appreciated that four client devices is described by way of example only and that any suitable number of client devices may be used. The processor 24 is operative to define (block 36) P multi-user groups with each multi-user group of the P multi-user groups having a capacity for M client devices from the N client devices. The processor 24 is operative to allocate (block 38) the N client devices to the P multi-user groups with each client device of the N client devices being equally represented in the P multi-user groups. It will also be noted that each client device is not allocated more than once to one multi-user group. It will be appreciated that defining the groups and allocating the client devices to the groups may be performed as a single step.

In some embodiments, when the number of client devices N is not a multiple of M, the processor is operative to determine the number P to be equal to N (or k times N) and to allocate the N client devices to the P multi-user groups with each client device of the N client devices being allocated to M (or k times M) different instances of the P multi-user groups (given that k is an integer ranging from 1 to [C(N−1, M−1)]/M). When the number of client devices N is a multiple of M, the processor 24 is operative to determine the number P to be equal to N divided by M (or k times N divided by M) and to allocate the N client devices to the P multi-user groups with each client device of the N client devices being allocated to only one instance (or k instances) of the P multi-user groups (given that k is an integer ranging from 1 to C(N−1, M−1)).

In other embodiments, whether the number of client devices N is multiple of M or not a multiple of M, the processor is operative to determine the number P to be equal to N (or k times N) and to allocate the N client devices to the P multi-user groups with each client device of the N client devices being allocated to M (or k times M) different instances of the P multi-user groups (given that k is an integer ranging from 1 to [C(N−1, M−1)]/M).

The scheduler running on the processor 24 (or on a processor in a remote server or cloud computing environment according to some embodiments) is operative to select (block 40) one group of the P multi-user groups for transmission of data. The MU-MIMO transmission equipment 30 is operative to transmit (block 42) data to the client devices associated with the selected multi-user group. Steps of block 40 and 42 are repeated for each new time period until the groups are changed. Once the groups are changed, the steps of blocks 40 and 42 are repeated for each new time period with the redefined groups.

In response to a change in the number of client devices wirelessly connected with the access point to S client devices, the processor 24 may be operative to: determine a number T of how many multi-user groups are to be formed to promote airtime fairness for the S client devices in which each client device of the S client devices will be equally represented in the to-be-formed multi-user groups; define T multi-user groups with each multi-user group of the T multi-user groups having a capacity for M client devices from the S client devices; and allocate the S client devices to the T multi-user groups with each client device of the S client devices being equally represented in the T multi-user groups. In other words, the steps of blocks 34, 36, 38 are repeated based on the new number of client devices S. Alternative methods for managing groups when the number of client devices change are described below with reference to FIGS. 6 and 7.

Figure 6:
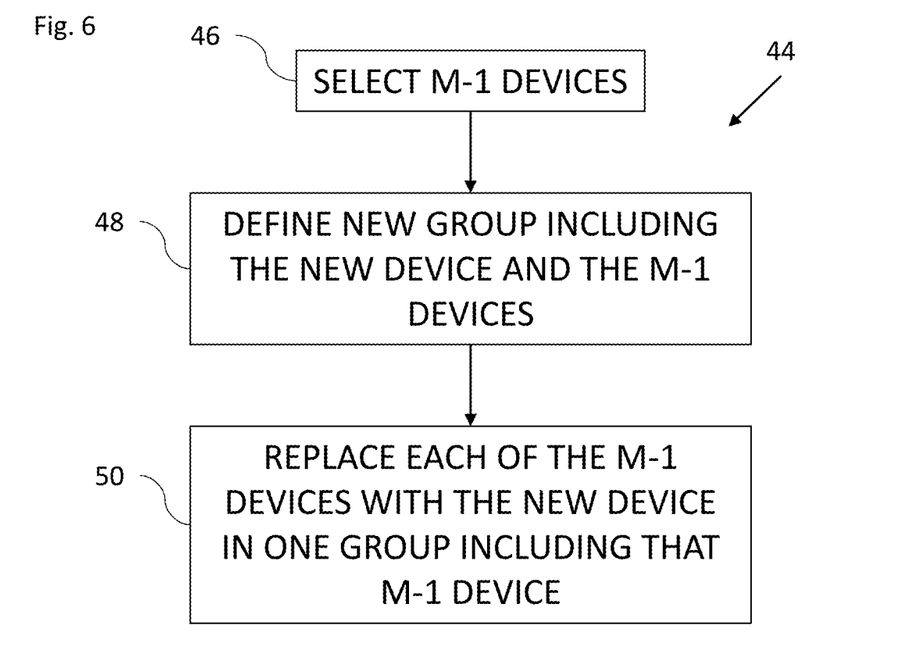
FIG. 6 is a flow chart including exemplary steps in a method for managing groups for use in the system of FIG. 1 when another client device connects to the access point.

Reference is now made to FIG. 6, which is a flow chart 44 including exemplary steps in a method for managing groups for use in the system 12 of FIG. 1 when another client device connects to the access point 10. Prior to the new client device being added there were N client devices and N groups with M client devices per group and M groups per client device. After the new client device is added, there are N+1 client devices. A recursive approach to manage the multiuser groups when another client device connects to the access point 10, thereby adding a new client device, is now described.

If the number of client devices N prior to adding the new client device is equal to M, then define all possible groups for N+1 client devices as described above with reference to FIG. 5.

If the number of client devices N prior to adding the new client device is greater than M, then the following steps may be followed. M−1 client devices of the current client devices (i.e. excluding the new client device) are selected from the N client devices. A new multi-user group is defined that includes the M−1 client devices and the new client device. M−1 groups are selected so that each selected group is mapped to (i.e., includes) a different one of the M−1 selected client devices. For each M−1 selected group, the mapped client device is replaced with the new client device.

The above steps may be illustrated by way of the following example. Assume that there were four client devices, s1, s2, s3 and s4, prior to adding a new client device s5. The existing groups include the following four groups: (s1, s2, s3), (s1, s2, s4), (s1, s3, s4) and (s2, s3, s4). Two existing client devices are selected, e.g., s1 and s2. A new group is formed with the selected client devices and the new client device, e.g., (s1, s2, s5). Two existing groups are selected which include s1 and s2, for example, (s1 s3 s4) and (s1, s2, s4), mapped to client devices s1 and s2, respectively. In group (s1, s3, s4), s1 is replaced with s5, yielding a revised group (s5, s3, s4). In group (s1, s2, s4), s2 is replaced with s5, yielding a revised group (s1, s5, s4). The total number of groups is now equal to five and the five client devices are equally represented in the groups.

The above is now described in more detail. The processor 24 (FIG. 4) is operative to, in response to an increase in the number of client devices wirelessly connected with the access point 10 (FIG. 4) to N+1 client devices including a new client device: select (block 46) any M−1 client devices of the N client devices yielding M−1 selected client devices; define (block 48) a new multi-user group that includes the M−1 selected client devices and the new client device; and for each selected client device of the M−1 selected client devices, replace (block 50) that selected client device with the new client device in one group of the P multi-user groups that includes that selected client device.

Figure 7:
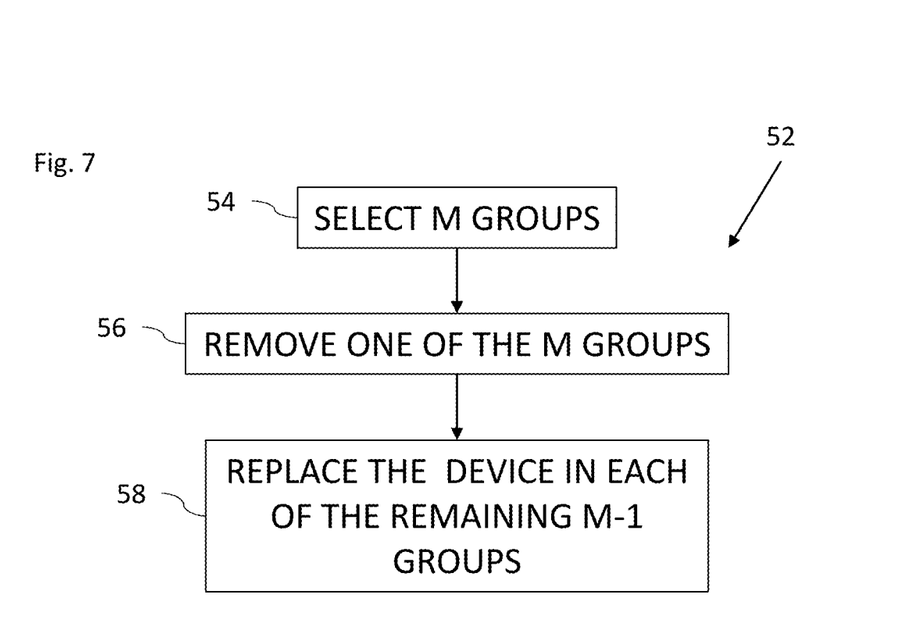
FIG. 7 is a flow chart including exemplary steps in a method for managing groups for use in the system of FIG. 1 when a client device connected to the access point disconnects.

Reference is now made to FIG. 7, which is a flow chart 52 including exemplary steps in a method for managing groups for use in the system 12 of FIG. 1 when a client device that is connected to the access point 10 (FIG. 4) disconnects from the access point 10. Prior to the client device being disconnected there were N client devices and N groups with M client devices per group and M groups per client device. A recursive approach to manage the multi-user groups when a client device ("disconnected client device") disconnects from the access point 10 leaving N−1 remaining client devices, is now described.

If the number of client devices N prior to removing the disconnected client device is equal to M+1, then delete all groups except the one that includes the remaining client devices.

If the number of client devices N prior to removing the disconnected client device is greater than M+1, the following steps may be performed. Select the M groups that include the disconnected client device. Remove one of the selected M groups leaving M−1 groups from the selected M groups. The removed group includes the disconnected client device and M−1 other client devices. For each of the M−1 other client devices, replace the disconnected client device with that client device (from the M−1 other client devices) in one of the aforementioned M−1 groups that does not include that client device (from the M−1 other client devices).

The above is now described in more detail. The processor 24 (FIG. 4) is operative to, in response to a reduction in the number of client devices wirelessly connected with the access point 10 (FIG. 4), by one client device ("disconnected client device") disconnecting from the access point, leaving N−1 client devices wirelessly connected with the access point: select (block 54) M groups of the P multi-user groups that include the disconnected client device; remove (block 56) one group of the M groups from the P multi-user groups leaving M−1 groups of the M groups, the removed group including the disconnected client device and a plurality of other client devices; and for each one other client device of the plurality of other client devices, replace (block 58) the disconnected client device with that other client device in one of the aforementioned M−1 groups that does not include that other client device.

In practice, some or all of the functions of the processor 24 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor executing suitable software. This software may be downloaded to a device in electronic form, over a network, for example. Alternatively or additionally, the software may be stored in tangible, non-transitory computer-readable storage media, such as optical, magnetic, or electronic memory (e.g., the memory 22).

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A system comprising: a processor; and a memory to store data used by the processor, wherein the processor is operative to:

determine a number P of P multi-user groups are to be formed to promote airtime fairness for N client devices in which each one client device of the N client devices will be equally represented in to-be-formed P multi-user groups and in which each one of the to-be-formed multi-user groups is to be actively considered by a scheduler for transmission purposes, the N client devices being associated with N wireless connections with an access point having multi-user simultaneous communication multiple-input multiple-output communication capability;

define P multi-user groups with each multi-user group of the P multi-user groups having a capacity for M client devices from the N client devices, N being greater than M, wherein the P multi-user groups are defined based on determining a divisibility of N by M; and allocate the N client devices to the P multi-user groups with each client device of the N client devices being equally represented in the P multi-user groups.

2. The system according to claim 1, wherein the processor is operative to:
based on determining that N is not divisible by M, determine the number P to be equal to k times N, k being an integer; and
allocate the N client devices to the P multi-user groups with each client device of the N client devices being allocated to k times M different instances of the P multi-user groups.

3. The system according to claim 1, wherein the processor is operative to:
based on determining that N is divisible by M, determine the number P to be equal to k times N divided by M, k being an integer; and
allocate the N client devices to the P multi-user groups with each client device of the N client devices being allocated to k instances of the P multi-user groups.

4. The system according to claim 1, wherein the processor is operative to, in response to a change in a number of client devices wirelessly connected with the access point to S client devices:
determine a number T of T multi-user groups are to be formed to promote airtime fairness for the S client devices in which each client device of the S client devices will be equally represented in the to-be-formed T multi-user groups;
define T multi-user groups with each multi-user group of the T multi-user groups having a capacity for M client devices from the S client devices, S being greater than M; and
allocate the S client devices to the T multi-user groups with each client device of the S client devices being equally represented in the T multi-user groups.

5. The system according to claim 1, wherein the processor is operative to, in response to an increase in a number of client devices wirelessly connected with the access point to N+1 client devices including a new client device:
select any M−1 client devices of the N client devices yielding M−1 selected client devices;
define a new multi-user group that includes the M−1 selected client devices and the new client device; and
for each selected client device of the M−1 selected client devices, replace the one selected client device with the new client device in one group of the P multi-user groups that includes the selected client device.

6. The system according to claim 1, wherein the processor is operative to, in response to a reduction in a number of client devices wirelessly connected with the access point by a first client device disconnecting from the access point, leaving N−1 client devices wirelessly connected with the access point and N being greater than M+1:
select M groups of the P multi-user groups that include the first client device;

remove a first group of the M groups from the P multi-user groups leaving M−1 groups of the M groups, the first group including the first client device and a plurality of second client devices; and
for each second client device of the plurality of second client devices, replace the first client device with the one second client device in one of the M−1 groups that does not include the second client device.

7. The system according to claim 1, wherein the processor is operative to select one group of the P multi-user groups for transmission of data.

8. The system according to claim 1, wherein the processor is disposed in a server, which is external to the access point.

9. The system according to claim 1, wherein the processor is disposed in the access point.

10. The system according to claim 1, further comprising multi-user simultaneous communication transmission equipment to transmit data to at least one of the N client devices based on a selected one of the P multi-user groups.

11. A method comprising:
determining a number P of P multi-user groups are to be formed to promote airtime fairness for N client devices in which each client device of the N client devices will be equally represented in to-be-formed P multi-user groups and in which each of the to-be-formed P multi-user groups is to be actively considered by a scheduler for transmission purposes, the N client devices being associated with N wireless connections with an access point having multi-user simultaneous multiple-input multiple-output communication capability;
defining P multi-user groups with each multi-user group of the P multi-user groups having a capacity for M client devices from the N client devices, N being greater than M, wherein the P multi-user groups are defined based on determining a divisibility of N by M; and
allocating the N client devices to the P multi-user groups with each client device of the N client devices being equally represented in the P multi-user groups.

12. The method according to claim 11, wherein:
based on determining that N is not divisible by M, the determining includes determining the number P to be equal to k times N, k being an integer; and
the allocating includes allocating the N client devices to the P multi-user groups with each one client device of the N client devices being allocated to k times M different instances of the P multi-user groups.

13. The method according to claim 11, wherein:
based on determining that N is divisible by M, the determining includes determining determine the number P to be equal to k times N divided by M, k being an integer; and
the allocating includes allocating the N client devices to the P multi-user groups with each one client device of the N client devices being allocated to k instances of the P multi-user groups.

14. The method according to claim 11, further comprising, in response to a change in a number of client devices wirelessly connected with the access point to S client devices:
determining a number T of T multi-user groups are to be formed to promote airtime fairness for the S client devices in which each client device of the S client devices will be equally represented in the to-be-formed T multi-user groups;

defining T multi-user groups with each one multi-user group of the T multi-user groups having a capacity for M client devices from the S client devices, S being greater than M; and allocating the S client devices to the T multi-user groups with each client device of the S client devices being equally represented in the T multi-user groups.

15. The method according to claim 11, further comprising, in response to an increase in a number of client devices wirelessly connected with the access point to N+1 client devices including a new client device:

selecting any M−1 client devices of the N client devices yielding M−1 selected client devices;

defining a new multi-user group that includes the M−1 selected client devices and the new client device; and for each selected client device of the M−1 selected client devices, replacing the selected client device with the new client device in one group of the P multi-user groups that includes the selected client device.

16. The method according to claim 11, further comprising, in response to a reduction in a number of client devices wirelessly connected with the access point by a first client device disconnecting from the access point, leaving N−1 client devices wirelessly connected with the access point and N being greater than M+1:

selecting M groups of the P multi-user groups that include the first client device;

removing a first group of the M groups from the P multi-user groups leaving M−1 groups of the M groups, the first group including the first client device and a plurality of second client devices; and for each second client device of the plurality of second client devices, replacing the first client device with the second client device in one of the M−1 groups that does not include the second client device.

17. The method according to claim 11, further comprising selecting one group of the P multi-user groups for transmission of data.

18. The method according to claim 11, wherein the method is performed in: a server, which is external to the access point; or in the access point.

19. The method according to claim 11, further comprising transmitting data to at least one of the N client devices based on a selected one of the P multi-user groups.

20. A software product, comprising a non-transient computer-readable medium in which program instructions are stored, which instructions, when read by a central processing unit (CPU), cause the CPU to:

determine a number P of P multi-user groups are to be formed to promote airtime fairness for N client devices in which each one client device of the N client devices will be equally represented in to-be-formed P multi-user groups and in which each one of the to-be-formed multi-user groups is to be actively considered by a scheduler for transmission purposes, the N client devices being associated with N wireless connections with an access point having multi-user simultaneous multiple-input multiple-output communication capability;

define P multi-user groups with each multi-user group of the P multi-user groups having a capacity for M client devices from the N client devices, N being greater than M, wherein defining the P multi-user groups is based on determining a divisibility of N by M; and allocate the N client devices to the P multi-user groups with each client device of the N client devices being equally represented in the P multi-user groups.

21. The system of claim 1, wherein the multi-user simultaneous multiple-input multiple-output communication capability of the access point includes at least one of: downlink multi-user multiple-input multiple-output (MU-MIMO) techniques, uplink MU-MIMO techniques, downlink orthogonal frequency-division multiple access (OFDMA) techniques and uplink OFDMA techniques.

22. The method of claim 11, wherein the multi-user simultaneous multiple-input multiple-output communication capability of the access point includes at least one of: downlink multi-user multiple-input multiple-output (MU-MIMO) techniques, uplink MU-MIMO techniques, downlink orthogonal frequency-division multiple access (OFDMA) techniques and uplink OFDMA techniques.

23. The software product of claim 20, wherein the multi-user simultaneous multiple- input multiple-output communication capability of the access point includes at least one of: downlink multi-user multiple-input multiple-output (MU-MIMO) techniques, uplink MU-MIMO techniques, downlink orthogonal frequency-division multiple access (OFDMA) techniques and uplink OFDMA techniques.

* * * * *

UNITED STATES PATENT AND TRADEMARK OFFICE
CERTIFICATE OF CORRECTION

PATENT NO. : 10,511,419 B2
APPLICATION NO. : 15/803785
DATED : December 17, 2019
INVENTOR(S) : Qing Zhao et al.

Page 1 of 1

It is certified that error appears in the above-identified patent and that said Letters Patent is hereby corrected as shown below:

In the Claims

Claim 1, Column 9, Line 2-3, please replace "simultaneous communication multiple-input" with --simultaneous multiple-input--

Claim 5, Column 9, Line 56, please replace "for each selected" with --for each one selected--
Claim 5, Column 9, Line 59, please replace "the selected" with --the one selected--

Signed and Sealed this
Eighteenth Day of February, 2020

Andrei Iancu
*Director of the United States Patent and Trademark Office*